Oct. 10, 1939.    C. W. RYERSON    2,176,014
VEHICLE JACKING STRUCTURE
Original Filed June 10, 1935    2 Sheets-Sheet 1

CREIGHTON W. RYERSON,
INVENTOR.

BY Beaman & Langford
ATTORNEYS.

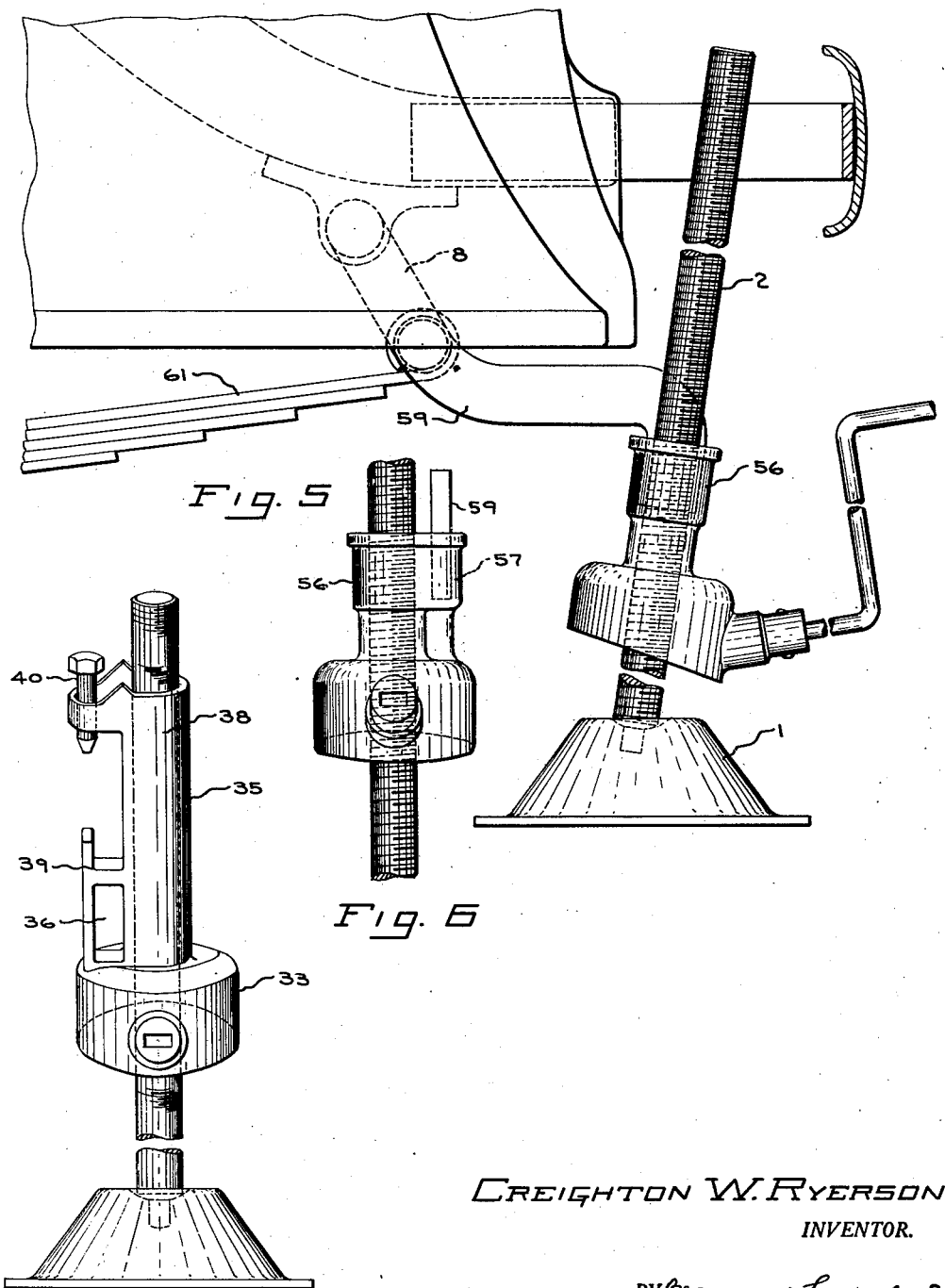

Patented Oct. 10, 1939

2,176,014

UNITED STATES PATENT OFFICE

2,176,014

VEHICLE JACKING STRUCTURE

Creighton W. Ryerson, Jackson, Mich., assignor to Ryerson & Haynes, Inc., Jackson, Mich., a corporation of Michigan Original application June 10, 1935, Serial No. 25,827, now Patent No. 2,092,719, dated September 7, 1937. Divided and this application September 7, 1937, Serial No. 162,593

3 Claims. (Cl. 254—133)

The present invention relates to improvements in jacking attachment structures for automotive vehicles and constitutes an improvement over the patent to Stephen De Orlow, No. 1,994,984 as well as being a division of my copending application Serial No. 25,827, filed June 10, 1935 patented September 7, 1937, as Patent No. 2,092,719. In applying a jack to the sprung structure of a vehicle it is considered desirable to rigidly secure the jack to the portion of the vehicle with which it engages rather than a mere contact engagement as has heretofore been common.

According to the present invention the vehicle is equipped with a receiving member which telescopically engages with a socket on the vehicle lifting part of the jack. An object of the invention, therefore, is to provide means for limiting relative movement between the vehicle lifting jack and the vehicle.

Another object of the invention is to provide telescoping means for limiting relative movement between the vehicle lifting jack and the vehicle.

Figure 1:
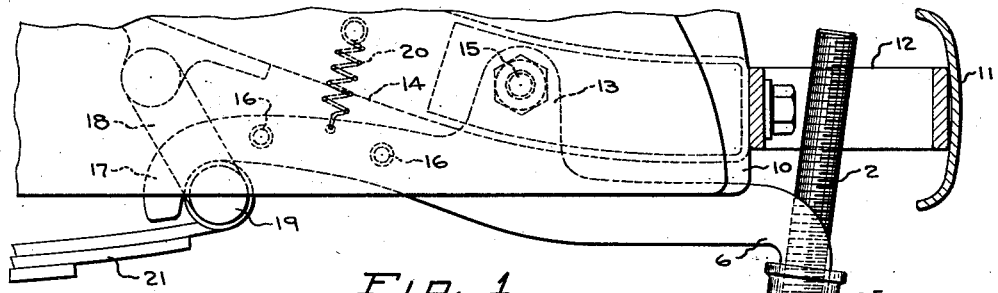
Figure 2:
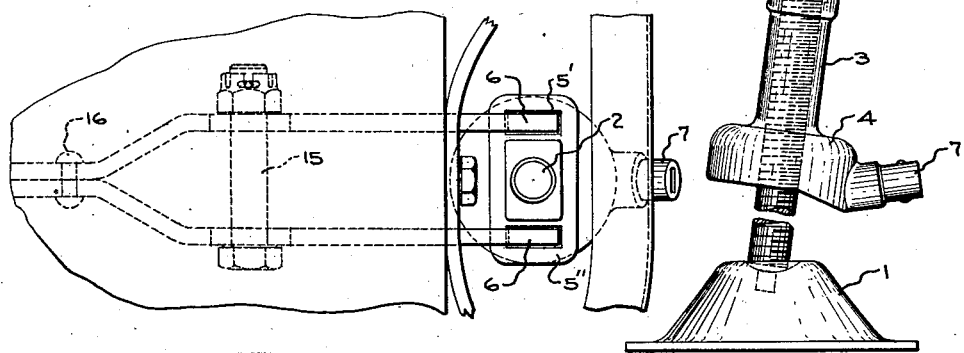
Figure 3:
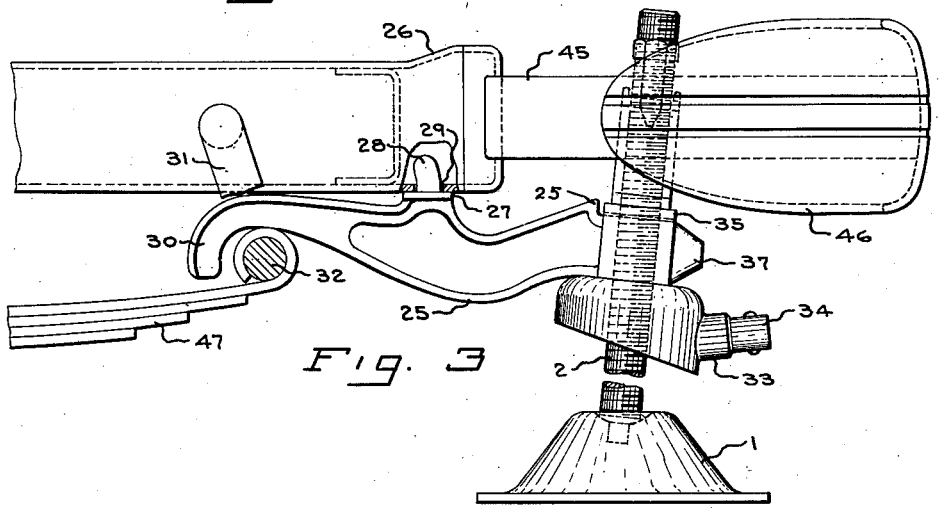

These and other objects will be apparent from the following specification when taken with the accompanying drawings in which Fig. 1 is a side elevation of one embodiment of the invention, Fig. 2 is a partial plan view of Fig. 1, Fig. 3 is an elevation of an embodiment of the invention, Fig. 4 is a side elevation of the jack of Fig. 3, Fig. 5 is an elevation of another embodiment of the invention, and Fig. 6 is a partial end elevation of the embodiment of Fig. 5.

Referring particularly to Fig. 1, the jack is provided with a base 1 receiving the thrust bar 2. The thrust bar 2 is seated in the base 1 for oscillatory movement, and may be seated in a manner such as disclosed in the aforesaid De Orlow patent. The thrust bar 2 is threaded and has mounted on its threads a lifting portion 3, having a casing 4, housing actuating mechanism, and a socket 5 for receiving the portions 6 of the jacking attachment pivoted to the vehicle frame. A connection 7 is provided for receiving a suitable crank for operating the actuating mechanism within the housing 4 and thus raising or lowering the lifting portion 3 on the thrust bar 2.

Mechanism for raising and lowering the lifting portion 3 is also disclosed in the aforesaid patent and may be used in the present jack. The socket 5 consists of two recesses 5' and 5" on either side of the thrust bar 2. The jack attachment portion 6 comprises two arms spaced at the outer ends, arranged to be received within the two recesses of the socket 5, respectively, as particularly shown in Fig. 2.

The socket 5 preferably extends in a direction parallel to the axis of the thrust bar 2, while the portions 6 are preferably disposed at an angle to the horizontal. As a result, when the portions 6 are telescopically received in the socket 5, the thrust bar 2 is disposed at an angle to the horizontal. The advantage of such an arrangement is to overcome any tendency of the vehicle to roll away from the jack. As should be readily understood, when the sprung portion of a vehicle is jacked to a sufficient height to lift a running wheel from the ground, if the initial position of the thrust bar is vertical, the thrust bar will lean toward the vehicle. In this position there is a tendency of the vehicle to roll away from the jack. If, however, at the beginning of the jacking operation the thrust bar is inclined away from the vehicle any tendency of the vehicle to roll away from the jack is overcome. It will be obvious that the same result obtained by inclining portions 6 of the jacking attachment may be obtained by inclining the socket 5 or by inclining both the jack attachment portions 6 and the socket 5. With the jack in load supporting position, the thrust bar 2 preferably extends between the body 10 of the vehicle and the bumper bar 11, the latter being suitably connected to the body 10 by a bumper bracket 12.

The portions 6 are in the form of levers pivotally supported midway between their ends by the offset tabs 13 pivotally supported in the frame 14 by a pin 15. The two forward ends of the portions 6 inwardly of the vehicle from the pivotal point thereof are bent toward each other and riveted together by rivets 16, as shown in Fig. 2 to provide an inwardly extending hook-shaped arm 17. The hook-shaped arm is arranged to cooperate with the spring shackle 18 in such a manner that it hooks over lower shackle bolt 19. A spring 20 connects the inwardly extending hook-shaped arm 17 with the vehicle frame and when the arm 17 is not in use prevents it from interfering with the normal operation of the spring 21, and its shackle 18 and prevents any rattle.

The operation of the embodiment of the invention disclosed in Figs. 1 and 2 is as follows: When it is desired to jack up a wheel of the vehicle, the jack is placed beneath the portions 6, and the lifting portion 3 is moved upwardly by rotating the connection 7 in a suitable manner, as by a detachable crank. As the thrust bar 2 is oscillatable on its base, it may be tilted until the sockets 5 are in alignment with the portions 6. The lifting portion is then moved upwardly, the portions 6 being telescopically received by the sockets 5 until the wheel is raised from the ground. The initial lifting of the jack carries the portions 6 to pivot about the pin 15, bringing the inwardly extending arm 17 into engagement with the shackle bolt 19. As the sprung structure is lifted, the arm 17 not only prevents inward movement of the shackle 18, but may be designed to also slightly move it outwardly toward the jack. Consequently the sagging of the spring 21 is restrained not only by the preventing of inward movement of the shackle, but also by the actual spring tensioning action resulting from moving the shackle outwardly. However, it is not essential that the shackle be moved outwardly. In practicing the present invention, the arm 17 can function merely as an abutment or stop.

Figs. 3 and 4 disclose another embodiment of the invention. In this embodiment the jacking attachment portion 25 is detachably secured to the frame 26 of the vehicle. The portion 25 is provided with a shoulder 27, from which projects a pin 28 in operative position being fitted into a hole 29 in the frame 26. The portion 25 is provided with an inwardly extending hook shaped arm 30 cooperating with the shackle 31 and shackle bolt 32 in the same manner as the embodiment of Figs. 1 and 2.

The jack shown in Fig. 3 comprises a base 1 and threaded thrust bar 2 having a housing 33 containing a suitable actuating mechanism, and a connection 34 for receiving a crank or other equivalent device for operating the actuating mechanism. The lifting portion 35 of the jack is movable with the housing 33 and comprises a socket 36 which is preferably rectangular and holds the correspondingly shaped projection 37 on the outer end of the attachment portion 25.

The operation of the embodiment disclosed in Figs. 3 and 4 is as follows: The jacking attachment 25 is first positioned with the pin 28 engaging with the vehicle frame and the hook-shaped arm 30 engaging the spring shackle 31. The jack is then connected with the attachment 25 by passing the projection 37 through the socket 36. Preferably the jack and jacking attachment is so designed to permit the jack to be received between the frame 26 and the bumper bar 45 carried by the mounting bar 46. With the weight of the vehicle supported through the spring 47, the shackle 31 will assume the position shown in Fig. 3. Operation of the jack to elevate the housing 33 brings the arm 30 into stressed engagement with the shackle 31 and the hooked shape of the arm 30 prevents the shackle 31 from swinging to the left to limit the sag of the spring 47 as the sprung structure is lifted.

As illustrated the housing 33 and lifting portion 35 in which the socket 36 is defined are integral. There may be provided, if desired, integral with the upper part of the portion 35, an attachment portion comprising a ledge 39 adapted to receive a bar carried by the sprung structure, such as a part of the bumper structure, and a screw 40 for holding the bar upon the ledge 39 in a manner similar to that disclosed in the aforesaid patent.

The socket 36, it will be observed, is substantially horizontal and the inward movement of the attachment portion 25 is limited by a shoulder 25'. Thus the structure of Figs. 3 and 4 is distinguished from the structure of Figs. 1 and 2 wherein the sockets 5' and 5" are substantially vertical and the attachment portions 6 are limited in their inward movement by engagement with the bottom of the sockets 5' and 5".

Another embodiment of the invention is disclosed in Figs. 5 and 6. In that embodiment the jack is somewhat similar to that in the embodiment of Figs. 1 and 2, but differs in that the lifting portion 56 has a single recessed socket 57. In this modification, instead of having a lever or arm engaging the spring shackle, the spring shackle 58 is provided with an extension 59, the extension comprising the jacking attachment portion, and is telescopically received in the socket 57. The operation of this modification is such that as the lifting portion 56 is moved upwardly the shackle 58 is pivoted outwardly about its upper pivotal point, tensioning the spring 60 and consequently restraining the tendency of the spring 61 to sag.

Of the foregoing structures that part relating to the restraining of sagging of the vehicle supporting springs is not a part of the present invention and is claimed in my aforesaid copending application Serial No. 25,827, filed June 10, 1935. The present invention relates only to the telescoping connection between the jack and the attachment portion on the vehicle. The specific attachment portions shown and described are examples only and other forms of attachment portions within the scope of the claims are contemplated. For instance, the attachment portion could be secured to the bumper structure or be rigid with the frame.

Having thus described my invention, what I desire to secure by Letters Patent and claim is:

1. A vehicle jack adapted to be applied to a jacking attachment portion secured to the vehicle to raise the same comprising a supporting column, an attachment portion raised and lowered upon said column, said attachment portion including an upwardly opening socket for rigidly and telescopically receiving said jacking attachment.

2. A lifting jack adapted to be applied to a jacking attachment portion secured to a vehicle to raise the same, comprising a supporting column, an attachment portion supported by said column, said attachment portion including means disposed on diametrically opposite sides of said column for rigidly and telescopically receiving said jacking attachment portion.

3. A jack adapted to be applied to a downwardly projecting jacking attachment portion on a vehicle or the like to raise at least a portion of the vehicle, comprising means arranged to be raised and lowered, an upwardly opening socket on said first named means for rigid telescopic engagement with said jacking attachment portions, for restraining the vehicle or the like being raised, from moving away from the jack, and means to raise and lower said first named means.

CREIGHTON W. RYERSON.